United States Patent
Ju et al.

(10) Patent No.: US 9,618,777 B2
(45) Date of Patent: Apr. 11, 2017

(54) ALL-FIBER ISOLATOR USING OPTICAL FIBER INCLUDING QUANTUM DOTS

(75) Inventors: Seong Min Ju, Gwangju (KR); Young Woong Kim, Goyang-si (KR); Pramod R. Watekar, Aurangabad (IN); Seong Mook Jeong, Gwangju (KR); Won Taek Han, Gwangju (KR)

(73) Assignee: ZETTO, LTD., Gwangju (KR)

( * ) Notice: Subject to any disclaimer, the term of this patent is extended or adjusted under 35 U.S.C. 154(b) by 111 days.

(21) Appl. No.: 14/424,603

(22) PCT Filed: Aug. 27, 2012

(86) PCT No.: PCT/KR2012/006845
§ 371 (c)(1),
(2), (4) Date: Feb. 27, 2015

(87) PCT Pub. No.: WO2014/034970
PCT Pub. Date: Mar. 6, 2014

(65) Prior Publication Data
US 2015/0261020 A1    Sep. 17, 2015

(51) Int. Cl.
*G02F 1/095* (2006.01)
*G02B 6/12* (2006.01)
*G02F 1/09* (2006.01)
*G02F 1/00* (2006.01)

(52) U.S. Cl.
CPC ............ *G02F 1/0955* (2013.01); *G02B 6/12* (2013.01); *G02F 1/0036* (2013.01); *G02F 1/093* (2013.01); *G02F 2201/02* (2013.01); *G02F 2202/108* (2013.01)

(58) Field of Classification Search
None
See application file for complete search history.

(56) References Cited

U.S. PATENT DOCUMENTS

| 7,440,165 | B2 | 10/2008 | Seo et al. |
| 8,755,642 | B2* | 6/2014 | Jiang ............... C03C 13/046 385/11 |
| 2011/0037454 | A1* | 2/2011 | Han ............... G02B 6/02052 324/96 |
| 2011/0103756 | A1 | 5/2011 | Rice et al. |
| 2011/0261454 | A1* | 10/2011 | Jiang ............... C03C 13/046 359/484.03 |

FOREIGN PATENT DOCUMENTS

| CN | 101206281 | 6/2008 |
| JP | 2000228551 | 8/2000 |

(Continued)

OTHER PUBLICATIONS

Sun et al. "Compact all-fiber optical Faraday components using 65-wt%-terbium-doped fiber with a record Verdet constant of-32 rad/(Tm)", Optics Express, vol. 18, No. 12, Jun. 7, 2010, pp. 12191-12196).*

(Continued)

Primary Examiner — Michelle R Connelly
(74) Attorney, Agent, or Firm — Cantor Colburn LLP

(57) ABSTRACT

An all-fiber isolator as an optical isolator comprises: an optical fiber acting as an optical light guide for propagating incident light; and a Faraday rotator for rotating by 45° a plane of polarization polarized by the polarizer. The all-fiber isolator exhibits a magneto-optic effect enough to be used as an optical isolator at a visible light wavelength by including quantum dots in a core layer and/or an internal cladding layer of the optical fiber.

7 Claims, 3 Drawing Sheets

(56) References Cited

FOREIGN PATENT DOCUMENTS

| KR | 1020040034993 | 4/2004 |
|----|---------------|--------|
| KR | 20060032696 | 4/2006 |
| KR | 1020060067181 | 6/2006 |
| KR | 1020110008024 | 1/2011 |
| KR | 1020110134869 | 12/2011 |

OTHER PUBLICATIONS

Sun et al. ("All-fiber optical isolator based on Faraday rotation in highly terbium-doped fiber", Optics Letters, vol. 35, No. 5, Mar. 1, 2010, pp. 706-708).*

Sun, Lei ("All-fiber Faraday Devices Based on Terbium-doped Fiber", The Institute of Optics Arts, Sciences and Engineering, Edmund A. Hajim School of Engineering and Applied Sciences, University of Rochester, Rochester, New York, 2010, 130 pages).*

Peyghambarian et al., (Final Report: "In-fiber Magneto-optic Devices Based on Ultrahigh Verdet Constant Organic Materials and Holey Fibers"; College of Optical Sciences University of Arizona, Tucson, AZ, 2009, 30 pages).*

International Search Report—PCT/KR2012/006845 dated Feb. 19, 2013.

Ju, et al., Development of a novel all-optical fiber isolator using a CdSe quantum dots doped optical fiber, OFC/NFOEC Technical Digest, Mar. 6, 2012.

Sun, et al., All-fiber optical isolator based on Faraday rotation in highly terbium-doped fiber, Optics Letters, vol. 35, No. 5, Mar. 1, 2010, pp. 706-708.

* cited by examiner

ALL-FIBER ISOLATOR USING OPTICAL FIBER INCLUDING QUANTUM DOTS

TECHNICAL FIELD

The present invention relates to an optical isolator, and more particularly, to an all-fiber optical isolator having an increased magneto-optical effect.

BACKGROUND ART

An optical isolator is a non-reciprocal optical device that permits the transmission of light in one direction but blocks the unwanted reflection of light and the unwanted transmission of light. Due to this function, the optical isolator is attracting a lot of attention for use in high-power optical fiber lasers, optical amplifiers and high-speed optical fiber communication systems.

When linearly polarized light passes through a magneto-optical medium under a magnetic field, it rotates its plane of polarization by 45° and returns to the magneto-optical medium. The polarization plane of the back-reflected light rotates again by 45° so that the back-reflected light that rotated by 90° will be blocked and isolated.

The most common isolators are optical isolators that need bulk optical devices such as birefringent plates and special launching lenses, which need precision alignment and careful handling. In recent years, all-fiber optical isolators have attracted a lot of attention for use as all-optical devices in optical laser systems and fiber optical amplifiers, because they offer advantages including low insertion loss, high reflection properties and high isolation. Particularly, a high-power Yb-doped optical fiber laser (pulse type) system that operates at 660 nm (multi-kW power level) was developed for use in industrial and biomedical applications.

However, an all-fiber optical isolator that operates at a wavelength of 660 nm has not yet been developed. This is mainly because of the low isolating sensitivity of silica glass fiber, and this low sensitivity is due to the low magneto-optical sensitivity of the silica fiber at visible wavelengths (Verdet constant: −0.64 rad/Tm at 1550 nm, and −0.22 rad/Tm at 1310 nm).

Specialty optical fibers such as annealed fiber, twisted fiber and flint glass fiber have been proposed to reduce the linear birefringence of optical fiber thereby increase the magneto-optical sensitivity, but a complex fabrication process, a high slicing loss and high costs still remain as problems.

In an attempt to overcome these problems, phosphate or borosilicate glass optical fibers incorporated with Tb ions, which have a high Verdet constant, were reported, in which a rod-in-tube technique is used.

However, it was found that the propagation loss of the fibers is much larger than the propagation loss of silica optical fiber.

DISCLOSURE

Technical Problem

Accordingly, the present invention has been made in order to solve the above-described problems occurring in the prior art, and an object of the present invention is to provide an all-fiber optical isolator having an increased magneto-optical effect.

Technical Solution

In order to accomplish the above object, the present invention provides an all-fiber optical isolator that exhibits a magneto-optical effect sufficient to act as an optical isolator at visible wavelengths, the all-fiber optical isolator including: an optical fiber serving as an optical waveguide that transmits incident light; a polarizer configured to polarize the incident light; and a Faraday rotator configured to rotate the plane of polarization of the light, polarized by the polarizer, by 45°, wherein the optical fiber includes a core layer containing at least one selected from the group consisting of a compound semiconductor, a rare earth element, a paramagnetic material, a diamagnetic material, magneto-optical glass, and a magneto-optical single crystal.

The optical fiber includes a cladding layer or an inner cladding layer, which contains at least one selected from the group consisting of a compound semiconductor, a rare earth element, a paramagnetic material, a diamagnetic material, magneto-optical glass, and a magneto-optical single crystal.

Preferably, the compound semiconductor is a PbSe, PbS, PbTe, CdMnTe, CdMnTe, ZnMnTe, MnGeAs$_2$, MnGeP$_2$, CdMnSe, CdSe, ZnSe, ZnXO (X=Co, Mn), As$_2$S$_2$, Bi$_{12}$SiO, Y$_3$Fe$_5$O$_{12}$, ZnO or CdS quantum dot; the rare earth element is a La, Ce, Pr, Nd, Pm, Sm, Eu, Gd, Tb, Dy, Ho, Er, Tm, Yb or Lu quantum dot; the paramagnetic material is an Fe, Ni, Co, Cr, Mn, Pt, Al or Ti quantum dot; the diamagnetic material is a Bi, Sb, P, Au, Ag, Hg, Cu or Pb quantum dot; the magneto-optical glass is a FR-5, FR-7, MOS-4, MOS-10, Tb-10, Tb-12 or Tb-15 glass quantum dot or fine powder; and the magneto-electrical single crystal is a TGG (terbium gallium garnet) crystal or YIG (yttrium iron garnet) crystal quantum dot or fine powder.

Preferably, the compound semiconductor is a Cd$_{0.5}$Mn$_{0.5}$Te quantum dot.

Preferably, the visible wavelength is 660 nm.

Preferably, the magneto-optical effect is a Faraday effect corresponding to a Verdet constant of 3.5-5.5 radT$^{-1}$ m$^{-1}$ at a wavelength of 660 nm.

Advantageous Effects

According to the present invention, the optical fiber in the all-fiber optical isolator contains quantum dots that increase the magneto-optical effect of the all-fiber optical isolator. Thus, even when a weak magnetic field is applied from the Faraday rotator or a magnetic field is applied to a short length of the optical fiber, a high Faraday effect can be exhibited so that the plane of polarization of light can be rotated by 45°. In addition, the optical fiber core made of a glass component, which hardly exhibited the Faraday effect of light in the visible wavelength region in the prior art, can exhibit a high Faraday effect of light at various wavelengths, including a wavelength of at 660 nm required for biomedical applications.

BEST MODE

Figure 1:
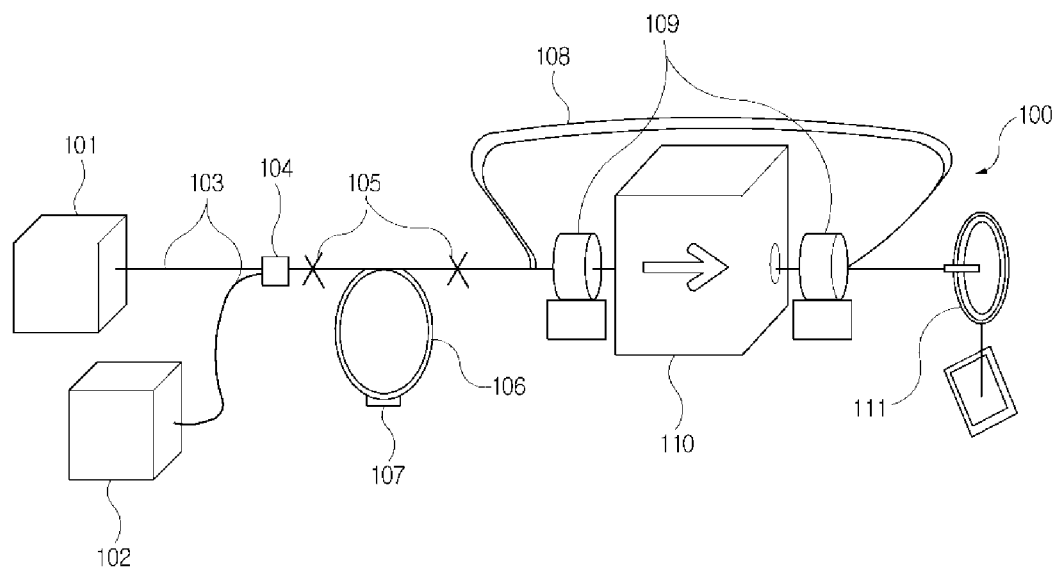
FIG. 1 schematically shows an experimental system for measuring the magneto-optical properties of an all-fiber optical isolator including a CdSe quantum-dot-doped optical fiber according to the present invention.

All terms used herein, including technical or scientific terms, have the same meanings as understood by those having ordinary knowledge in the technical field to which the present invention pertains. The terms defined in dictionaries should be interpreted as having meanings identical to those defined in the context of related technology. Unless otherwise defined, the terms should not be interpreted as having ideal or excessively formative meanings.

The present invention provides an all-fiber optical isolator having an increased magneto-optical effect (Faraday effect or Zeeman effect).

An optical isolator that permits the transmission of light in one direction generally includes: an optical fiber serving as an optical waveguide that transmits incident light; a polarizer configured to polarize the incident light; and a Faraday rotator configured to rotate the plane of polarization of the light, polarized by the polarizer, by 45°.

However, in order to use light in the visible wavelength region as described above, it is required to further increase the magneto-optical effect of the optical isolator. According to the present invention, this requirement is satisfied by incorporating quantum dots into the core layer and/or cladding layer or inner cladding layer of the optical fiber. In addition, when the magneto-optical effect is increased, the intensity of a magnetic field in the Faraday rotator can be reduced, and the range of the applied magnetic field can also be reduced.

As used herein, the term "inner cladding layer" refers to an inner cladding layer in a structure including the inner cladding layer, a trench layer and an outer cladding layer, as disclosed in Korean Patent Publication No. 2011-0134869 (entitled "Low-bending-loss optical fiber") filed in the name of the present inventors. The present invention can be applied to an optical fiber comprising a core layer and a cladding layer, which is a general optical fiber structure, but also to the core layer and/or inner cladding layer of the optical fiber structure disclosed in the above patent publication.

Herein, the quantum dots may be quantum dots made of at least one selected from the group consisting of a compound semiconductor, a rare earth element, a paramagnetic material, a diamagnetic material, a magneto-optical glass, and a magneto-optical single crystal.

Preferably, the compound semiconductor is a PbSe, PbS, PbTe, CdMnTe, CdMnTe, ZnMnTe, $MnGeAs_2$, $MnGeP_2$, CdMnSe, CdSe, ZnSe, ZnXO (X=Co, Mn), $As_2S_2$, $Bi_{12}SiO$, $Y_3Fe_5O_{12}$, ZnO or CdS quantum dot.

Preferably, the rare earth element is a La, Ce, Pr, Nd, Pm, Sm, Eu, Gd, Tb, Dy, Ho, Er, Tm, Yb or Lu quantum dot.

Preferably, the paramagnetic material is Fe, Ni, Co, Cr, Mn, Pt, Al or Ti quantum dot.

Preferably, the diamagnetic material is a Bi, Sb, P, Au, Ag, Hg, Cu or Pb quantum dot.

Preferably, the magneto-optical glass is selected from among FR-5 and FR-7 (Schott, Germany), MOS-4 and MOS-10 (MolTech GmbH, Germany), and Tb-10, Tb-12 and Tb-15 (Foctek Photonics Inc., China), and is powdered to form a quantum dot or very fine powder, which is then incorporated into the core layer and/or cladding layer or inner cladding layer of the optical fiber.

As used herein, the term "magneto-optical glass" means glass which is manufactured by adding rare earth elements, including Tb, Y, Eu, etc., to a borosilicate glass composition, and the optical properties of the glass under varying magnetic field that is applied thereto.

Preferably, the magneto-optical single crystal may be powdered to form a quantum dot or very fine powder, which is then incorporated into the core layer and/or cladding layer or inner cladding layer of the optical fiber. This magneto-optical single crystal is named according to the chemical components thereof, and representative examples thereof include a TGG (terbium gallium garnet) crystal and a YIG (yttrium iron garnet) crystal.

Figure 2:
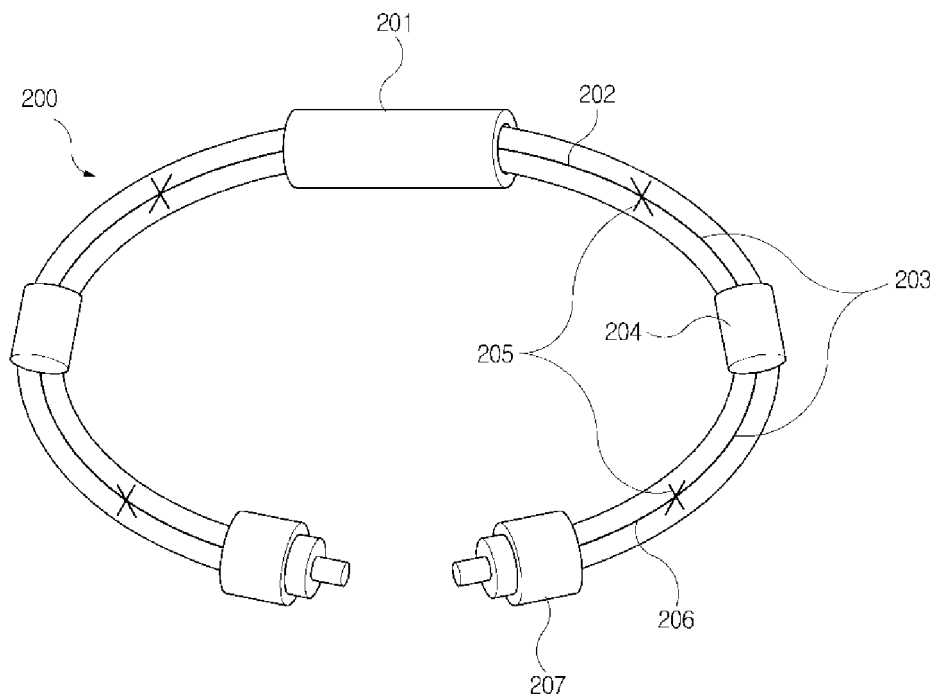
FIG. 2 schematically shows the structure of an all-fiber optical isolator according to the present invention.

FIG. 2 shows an example of an all-fiber optical isolator comprising an optical fiber according to the present invention. In FIG. 2, a symmetrical structure is shown, and thus parts indicated by reference numerals are the same as parts not indicated by reference numerals. Referring to FIG. 2, a Faraday rotator 201 may be a permanent magnet or a solenoid, but is not limited thereto. An optical fiber, disposed in the Faraday rotator 201 and extending from the Faraday rotator 201 to a splicing point 205, is a quantum-dot-doped optical fiber 202. Also, an optical fiber, disposed in a linear polarizer 204 and extending from the linear polarizer 204 to the splicing point 205, is a polarization-maintaining optical fiber 203. An optical fiber extending from a connector 207 to the splicing point 205 may be a single-mode optical fiber or a multi-mode optical fiber. The optical fibers as described above, the Faraday rotator 201, the linear polarizer 204 and the connector 207 constitute a single all-fiber optical isolator 200.

The present inventors could induce a high Faraday effect by doping the core layer and/or cladding layer or inner cladding layer of the optical fiber with CdSe quantum dots or incorporating $Cd_{0.5}Mn_{0.5}Te$ quantum dots into core layer and/or cladding layer or inner cladding layer of the optical fiber. Hereinafter, examples of the present invention will be described in detail with reference to the accompanying drawings. The examples of the present invention will be described so that the present invention can be easily carried out by those skilled in the art. Those skilled in the art will easily appreciate that the following examples can be modified in various forms without deviating from the concept and scope of the present invention. In the drawings, like parts are indicated by like reference numerals, if possible.

MODE FOR INVENTION

Example 1

Fabrication and Performance of the all-Fiber Optical Isolator Including Optical Fiber Doped with CdSe Quantum Dots An optical fiber preform doped with CdSe quantum dots was fabricated by modified chemical vapor deposition (MCVD). Specifically, a core layer of alumino-germano-silica glass deposited on a silica glass tube was doped with a toluene solution containing CdSe quantum dots (Sigma-Aldrich: Lumidot CdSe QDs in toluene; peak absorption: 650 nm; 7.5 mg in 1.5 ml solution) by a solution doping process at room temperature. In order to reduce dopant evaporation that could occur during the modified chemical vapor deposition process, the wet tube was dried after the solution doping process, and then an additional glass layer was deposited thereon. The tube was dried, sintered, partially shrunk, and sealed with a rod material. Finally, the preform was drawn into a fiber having an outer diameter of 125 μm using a drawing device at 2150° C. The manufactured fiber had a core diameter of 5.4 μm and a cut-off wavelength of 560 nm. Also, the optical fiber had an absorption coefficient of about 0.003 $m^{-1}$ at 660 nm, as measured by a cut-back method. The Verdet constant of the optical fiber doped with CdSe quantum dots was measured to be 5.3 $radT^{-1}$ $m^{-1}$ at 633 nm.

FIG. 1 shows an experimental system for measuring the optical properties of a CdSe quantum-dot-doped optical fiber 108 manufactured according to the above-described method. The Faraday rotation angle of the CdSe quantum-dot-doped optical fiber was determined by a polarimeter (PA-510; Thorlabs, USA) using a 660 nm laser diode 101 and a linear polarizer 107 under a magnetic field applied by a Faraday rotator 110. Herein, the output power of the laser diode 101 was 1.1 mV, and the spectrum of light reflected by a reflection mirror was monitored by an optical spectrum analyzer 102 (OSA; resolution: 1 nm). The CdSe quantum-dot-doped optical fiber 108 was a single-mode optical fiber (operating at a wavelength of 660 nm), and the fiber-type linear polarizer 107 was directly spliced into fibers.

Figure 3:
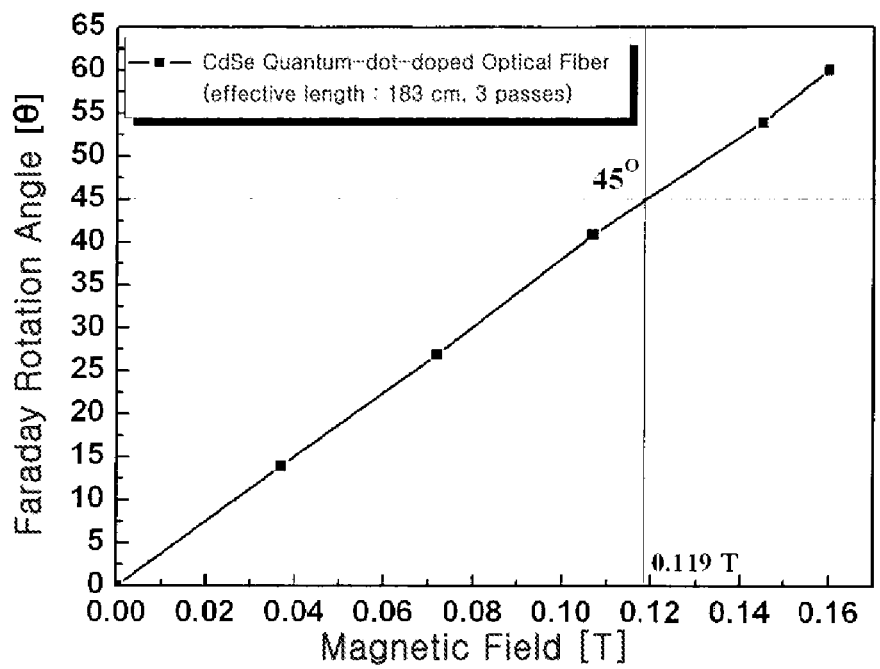
FIG. 3 is a graph showing the Faraday rotation angle of a CdSe quantum-dot-doped optical fiber according to the present invention as a function of a magnetic field.

FIG. 3 shows the Faraday rotation angle at 660 nm as a function of magnetic field. During the measurement, the CdSe quantum-dot-doped optical fiber 108 was wound around the Faraday rotator 110 to increase the effective length of the fiber, which was the total length of the optical fiber in the same direction as that of the magnetic field. As the applied magnetic field was increased by changing the current of the Faraday rotator 110 composed of a solenoid, the Faraday rotation angle of the CdSe quantum-dot-doped optical fiber 108 increased linearly as shown in FIG. 3. When a magnetic field of 0.1 T was applied to the fiber having an effective length of 183 cm, the Faraday rotation angle reached 45°. This result indicates that an all-fiber optical isolator that blocks reflected light at 660 nm is possible, because the 90° rotation polarization angle of back-reflected light is attributable to the non-reciprocal nature of the Faraday effect.

Figure 4:
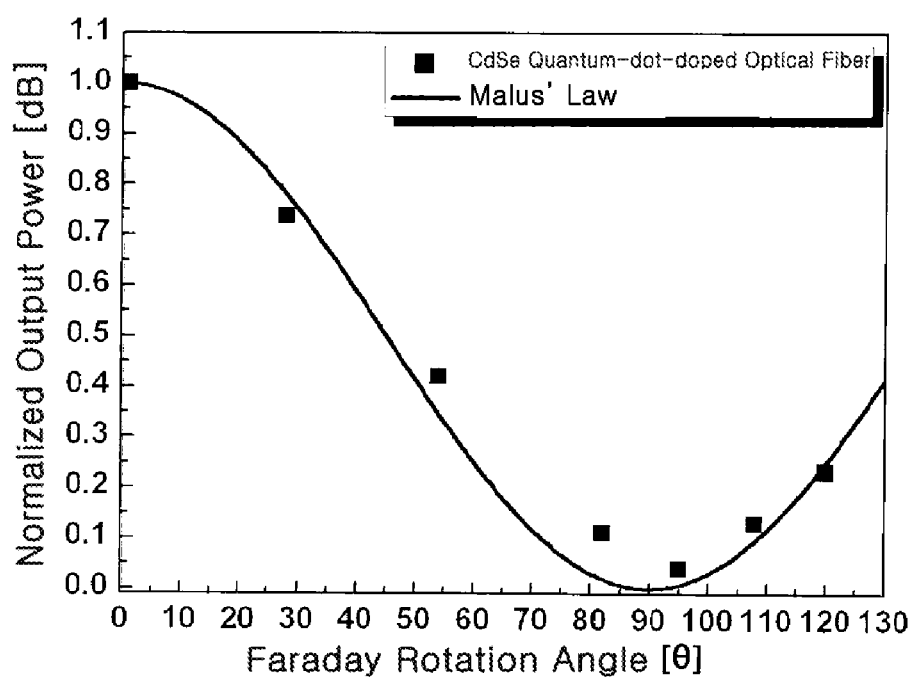
FIG. 4 is a graph showing the normalized output power of a CdSe quantum-dot-doped optical fiber according to the present invention as a function of the Faraday rotation angle.
Figure 5:
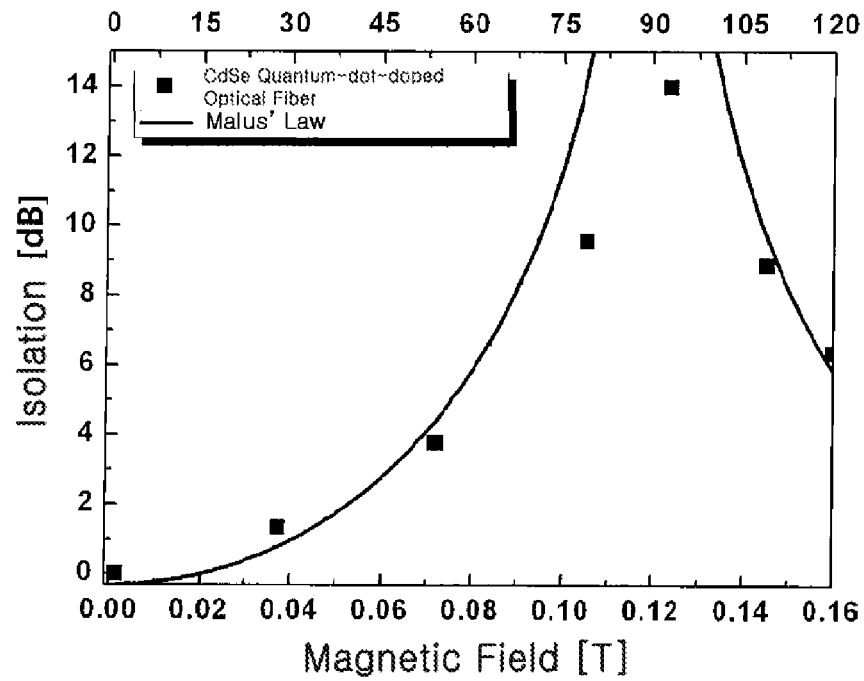
FIG. 5 is a graph showing the optical isolation of a CdSe quantum-dot-doped optical fiber according to the present invention as a function of an applied magnetic field.

Because light is reflected directly backward, the Faraday rotation is additive due to the non-reciprocal nature of the Faraday effect. The measurement of actually reflected power at the input side with a change in the strength of the magnetic field will give the idea of isolation by the fiber optic system. This experiment was performed using a reflection mirror 111 that reflects 660 nm excitation light from CdSe quantum dots, and the back-reflected power was measured using a 3 dB coupler (660 nm) 104 as shown in FIG. 1. FIG. 4 shows the variation of normalized output power (reflected power) of the fiber as a function of the Faraday rotation angle, measured when the magnetic field was changed from 0 T to 0.16 T. Normalization was made with an output power without a magnetic field. It was found that the normalized output power decreased with the increase in Faraday rotation angle, and no output power was detected at an angle of 90°, indicating an excellent isolation property. When the Faraday rotation angle was greater than 90°, the output power increased again, because the polarization state started to return to the original state. The reflected optical power can be simply described by the Malus' law.

$$I = I_0 \cos^2 \theta \quad \text{Equation 1}$$

wherein I and $I_0$ are the powers of a reflected optical signal (back ratio) and an incident light source (front ratio), respectively, and θ is the Faraday rotation angle. It should be noted that attenuation factors such as optical power bending, coupling, splicing and reflection loss were excluded in the equation. As shown in FIG. 4, the obtained output data were fitted to a transition curve and well matched with small deviation error. FIG. 5 shows the optical isolation of the CdSe quantum-dot-doped optical fiber 108 as a function of magnetic field applied thereto. The maximum isolation was about 14 dB at 0.1 T, and it increased as the magnetic field increased from 0 to 0.1 T. When the magnetic field was larger than 0.1 T, the isolation decreased due to the fact that the polarization state returned to the original input state.

The inconsistency between the experimental results in FIGS. 4 and 5 and the Malus' law is attributable to the linear birefringence of the optical fiber caused by bending because the optical fiber is wound around the Faraday rotator 110 to increase the effective length. In order to increase the precision and performance of the all-fiber optical isolator, the linear birefringence should be minimized along the fiber. This can be performed using a specialty optical fiber having a large Verdet constant. To induce a very high circular birefringence of the optical fiber, a fiber having a short length enough to be linear at a fixed length without twisting or bending the optical fiber can be used. The parameters of the experiment performed for the all-fiber optical isolator using the CdSe quantum-dot-doped optical fiber while changing a magnetic field are summarized in Table 1 below. The all-fiber optical isolator can be applied in various optical fields, including optical switches, optical modulators, non-reciprocal elements in laser gyroscopes, optical circulators, and optical sensors.

The parameters of the experiment performed for the all-fiber optical isolator using the CdSe quantum-dot-doped optical fiber while changing magnetic field are summarized in Table 1 below.

TABLE 1

| Solenoid current (A) | Magnetic field (T) | Faraday angle (θ) | Power (dBm/nW) | Normalized power | Isolation (dB) |
| --- | --- | --- | --- | --- | --- |
| 0 | 0 | 0 | −50.67/8.56 | 1.000 | 0 |
| 10 | 0.037 | 27.8 | −51.99/6.31 | 0.737 | 1.32 |
| 20 | 0.072 | 53.8 | −54.44/3.59 | 0.420 | 3.77 |
| 30 | 0.107 | 81.8 | −60.22/0.95 | 0.111 | 9.55 |
| 35 | 0.124 | 95.0 | −64.64/0.04 | 0.034 | 13.97 |
| 40 | 0.145 | 107.8 | −59.54/1.11 | 0.130 | 8.87 |
| 45 | 0.160 | 120.0 | −57.02/1.98 | 0.232 | 6.34 |

Example 2

Magneto-Optical Properties of the Optical Fiber Containing $Cd_{0.5}Mn_{0.5}Te$ Quantum Dots An optical fiber preform containing $Cd_{0.5}Mn_{0.5}Te$ quantum dots was fabricated by modified chemical vapor deposition (MCVD). Specifically, a porous core layer was formed in a silica glass tube using $SiCl_4$ and $GeCl_4$ at 1650° C. and partially sintered. Then, the porous core layer was impregnated with a solution of 0.475 g (0.1M) of $Cd_{0.5}Mn_{0.5}Te$ powder (International Crystal Lab.) in 5 ml of nitric acid (70%; Junsei Chem.), thereby fabricating an optical fiber preform containing $Cd_{0.5}Mn_{0.5}Te$ quantum dots. The fabricated optical fiber preform was drawn into an optical fiber at a temperature of 2000° C. or lower. The optical fiber was passed through the center of a solenoid (Walker LDJ, 3.0-28-1500DC), and then the magneto-optical properties thereof according to a change in a magnetic field were measured using laser diode (LD) light source at 660 nm and a polarimeter (THORLABs, PA-510).

Figure 6:
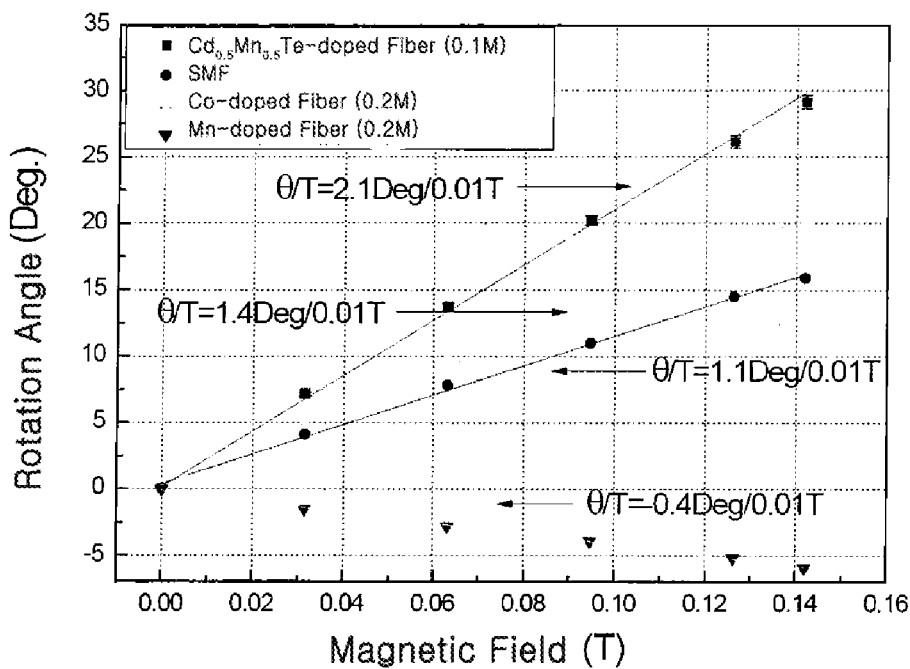
FIG. 6 is a graph showing the results of measuring the Faraday rotation angles of $Cd_{0.5}Mn_{0.5}Te$-doped optical fiber, CdSe-doped optical fiber, co-doped optical fiber and Mn-doped optical fiber at 660 nm according to the present invention.

To examine the influence of Mn ions found to be present in the optical fiber core, an optical fiber doped with Mn ions was manufactured for comparison. Also, to evaluate the Faraday rotation property of the optical fiber containing $Cd_{0.5}Mn_{0.5}Te$ quantum dots, the an optical fiber was compared with a cobalt (Co) ion-doped optical fiber, a CdSe quantum-dot-doped optical fiber manufactured by the present inventors, and a general single-mode optical fiber. The magneto-optical properties of each of the optical fibers were measured using a polarimeter by applying a parallel magnetic field to the optical fiber while increasing the solenoid current value. As a result, as can be seen in FIG. 6, the Faraday rotation angle of all the optical fibers increased linearly as the magnetic field increased. Also, under the same magnetic field, the optical fiber containing $Cd_{0.5}Mn_{0.5}Te$ quantum dots showed a Faraday rotation angle whose absolute value was about 1.5 times larger than that of the Co ion-doped optical fiber, about 6 times larger than that of the Mn ion-doped optical fiber, about 1.5 times larger than that of the CdSe-doped optical fiber, and about 2 times larger than that of SMF. In addition, however, the Mn ion-doped optical fiber showed an increase in the negative direction, suggesting that $Cd_{0.5}Mn_{0.5}Te$ quantum dots had a greater influence on the increase in Faraday rotation angle of the $Cd_{0.5}Mn_{0.5}Te$ quantum-dot-doped optical fiber than Mn ions. This is because of the Zeeman effect of $Cd_{0.5}Mn_{0.5}Te$ quantum dots. The Verdet constants of the $Cd_{0.5}Mn_{0.5}Te$ quantum-dot-doped optical fiber, the Co ion-doped optical fiber, the Mn ion-doped optical fiber and the SMF, calculated using the measured Faraday rotation angles, were 5.12, 3.54, −1.04 and 2.77 $radT^{-1}\,m^{-1}$, respectively, at a wavelength of 660 nm.

Table 2 below shows the magneto-optical properties of the $Cd_{0.5}Mn_{0.5}Te$ quantum-dot-doped optical fiber, the Co ion-doped optical fiber and the Mn ion-doped optical fiber.

TABLE 2

|  | Effective length (m) | Magnetic field (T) | Rotation angle (θ) | Verdet constant ($radT^{-1}m^{-1}$) |
|---|---|---|---|---|
| $Cd_{0.5}Mn_{0.5}Te$-doped optical fiber | 0.7 | 0.142 | 29.18 | 5.12 |
| Co-doped optical fiber | 0.7 | 0.142 | 20.18 | 3.54 |
| CdSe-doped optical fiber | 0.7 | 0.142 | 20.28 | 3.56 |
| Mn-doped optical fiber | 0.7 | 0.142 | −5.93 | −1.04 |
| SMF | 0.7 | 0.142 | 15.82 | 2.77 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An all-fiber optical isolator that exhibits a magneto-optical effect sufficient to act as an optical isolator at a visible wavelength, the all-fiber optical isolator comprising:
   an optical fiber serving as an optical waveguide that transmits incident light;
   a polarizer configured to polarize the incident light; and
   a Faraday rotator configured to rotate a plane of polarization of the light, polarized by the polarizer, by 45°,
   wherein the optical fiber includes a core layer containing a $Cd_{0.5}Mn_{0.5}Te$ quantum dot.

2. The all-fiber optical isolator of claim 1, wherein the optical fiber includes a cladding layer or an inner cladding layer, which contains at least one selected from the group consisting of a compound semiconductor, a rare earth element, a paramagnetic material, a diamagnetic material, magneto-optical glass, and a magneto-optical single crystal, wherein the compound semiconductor is a $Cd_{0.5}Mn_{0.5}Te$ quantum dot.

3. The all-fiber optical isolator of claim 2, wherein the compound semiconductor is a PbSe, PbS, PbTe, CdMnTe, ZnMnTe, $MnGeAs_2$, $MnGeP_2$, CdMnSe, CdSe, ZnSe, ZnXO (X=Co, Mn), $As_2S_2$, $Bi_{12}SiO$, $Y_3Fe_5O_{12}$, ZnO or CdS quantum dot; the rare earth element is a La, Ce, Pr, Nd, Pm, Sm, Eu, Gd, Tb, Dy, Ho, Er, Tm, Yb or Lu quantum dot; the paramagnetic material is an Fe, Ni, Co, Cr, Mn, Pt, Al or Ti quantum dot; the diamagnetic material is a Bi, Sb, P, Au, Ag, Hg, Cu or Pb quantum dot; the magneto-optical glass is a FR-5, FR-7, MOS-4, MOS-10, Tb-10, Tb-12 or Tb-15 glass quantum dot or fine powder; and the magneto-electrical single crystal is a TGG (terbium gallium garnet) crystal or YIG (yttrium iron garnet) crystal quantum dot or fine powder.

4. The all-fiber optical isolator of claim 2, wherein the visible wavelength is 660 nm.

5. The all-fiber optical isolator of claim 2, wherein the magneto-optical effect is a Faraday effect corresponding to a Verdet constant of 3.5-5.5 $radT^{-1}\,m^{-1}$ at a wavelength of 660 nm.

6. The all-fiber optical isolator of claim 1, wherein the visible wavelength is 660 nm.

7. The all-fiber optical isolator of claim 1, wherein the magneto-optical effect is a Faraday effect corresponding to a Verdet constant of 3.5-5.5 $radT^{-1}\,m^{-1}$ at a wavelength of 660 nm.

\* \* \* \* \*